United States Patent [19]
Varichon

[11] 3,724,584
[45] Apr. 3, 1973

[54] VEHICLE GUIDANCE SYSTEM
[75] Inventor: Claude Varichon, Lyon, France
[73] Assignee: Compagnie Generale D'Electricite, Paris, France
[22] Filed: Mar. 18, 1971
[21] Appl. No.: 125,676

[30] Foreign Application Priority Data
  Mar. 20, 1970  France..............................7010171
  Dec. 11, 1970  France..............................7044828

[52] U.S. Cl..................................180/79, 104/244.1
[51] Int. Cl. ..............................................B62d 1/26
[58] Field of Search .....180/79; 104/242, 243, 244.1, 104/245, 247

[56] References Cited
UNITED STATES PATENTS 3,312,180  4/1967  Mueller..............................104/246
2,076,914  4/1937  Newton..............................104/243 X
2,925,875  2/1960  Bourdon............................104/245 X
3,119,349  1/1964  Hampton et al......................104/243

FOREIGN PATENTS OR APPLICATIONS 743,825    1/1933  France...............................104/247
1,272,938  8/1961  France...............................104/247
360,300    6/1938  Italy.................................104/247

Primary Examiner—Leo Friaglia
Assistant Examiner—Leslie J. Paperner
Attorney—Sughrue, Rothwell, Mion, Zinn & Macpeak

[57] ABSTRACT

Guidance systems including at least one detector mounted on a vehicle and a guide rail along the path to be travelled by the vehicle. Each detector is forced to remain in contact with the rail. A throw-off-center between the vehicle and the guide rail is sensed by the detectors which cause guiding wheels on the vehicle to turn in a direction to reduce the throw-off center.

4 Claims, 9 Drawing Figures

VEHICLE GUIDANCE SYSTEM

BACKGROUND OF THE INVENTION

1. Field of the Invention

This invention concerns a guidance system for vehicles all of whose wheels are guiding and can run in two directions, said vehicles being capable of being grouped in sets and being capable of running on public thoroughfares under manual control.

2. Description of the Prior Art

It is known, in effect, that one can use detectors attached to a vehicle and forced to follow a guide track, but guidance devices made so far on the one hand have a very complex structure and, on the other hand, have a structure that differs according to whether it is desired to guide the front or the rear axle.

SUMMARY OF THE INVENTION

According to the invention, guidance is provided with the help of mobile probes associated with a fixed reference constituted either by a central rail or by two lateral rails defining the trajectory to follow. On these rails are supported probes which are attached to the vehicle and which control the orientation of the wheels directly or by means of a servo-control.

The arrangement of the central rail is preferably adopted for constantly guided vehicles, such as subways, because it permits the easy execution of turnoffs and intersections.

The arrangement of the lateral rails is preferably adopted for socalled duomodal vehicles which operate either by two guide rails or by manual control on public thoroughfares because this permits easy introduction at the entry of the guided zone by moving the rails apart.

This invention generally speaking is characterized by the fact that all of the wheels of the vehicle are guiding and by the fact that, with each guiding axle, there are associated two sets of probes, placed on either side of the wheels, and that one or the other of these sets is placed into or out of action as a function of the direction of movement of the vehicle, said placement into or out of action being accomplished automatically at the same time as the change in direction of movement by means, especially of mechanical, pneumatic, hydraulic jacks or possibly by a combination of these means.

In the case of duomodal vehicles, it is moreover characterized by the fact that a steering wheel acts upon the wheels of the front axle parallel with the probes and that a system for returning into the straight position acts upon the rear axle.

Finally, for special vehicles, generally manually guided, such as for example, those of public works or other types of vehicles, which do not have preferential direction of movement, the invention is characterized by the fact that on each axle there are mounted, in parallel, a steering wheel and a return system for returning the wheels to the straight position.

The purposes and advantages of this invention will emerge from the following nonrestrictive specification given in combination with the drawings where:

BRIEF DESCRIPTION OF THE DRAWINGS

In FIG. 1, the vehicle, with automatically guided body 1 placed on axles 2 with guiding wheels 3 provided with pneumatic tires, is guided by a guide track means such as a protruding central rail R on which are supported the probes P which are mounted on the vehicle that runs on the surface 4. At the intersections, the rail is lowered so that its upper portion will be on the level of the ground and will make it possible for the pneumatic tires to clear it.

In FIG. 2, the guidance system involves a guide track means comprising two parallel rails R1 and R2 on which are supported the probes P1 and P2, respectively.

In these two positions, the probes are supported on the essentially vertical lateral faces of the guide rails and control the orientation of the direction wheels, either directly or indirectly through a servo-control. Due to the elasticity of the tires with which the wheels are equipped, the latter are deformed or they slip due to the action of the wind or of the centrifugal force in the curves, or the sticking action due to poor adherence to the ground. As a result of this, the trajectory of the wheels on the ground is not always the same and reveals gaps with respect to the theoretical trajectory which should be corrected through the orientation of the wheels depending especially upon the direction of movement of the vehicle.

Figure 1:
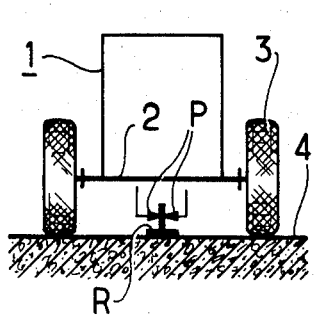
FIGS. 1 and 2 schematically show a guidance system, respectively, with center rail and with side rails.
Figure 2:
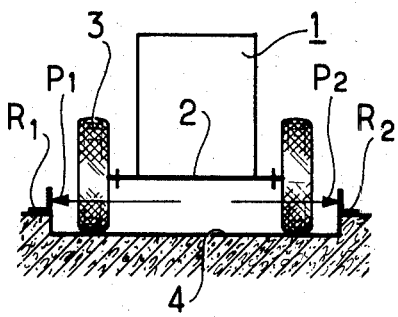
Figure 3:
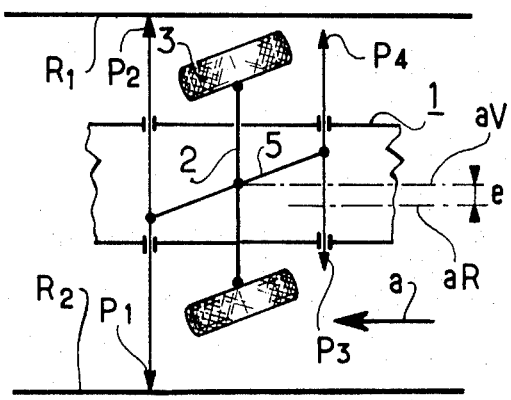
FIGS. 3 and 4 symbolically and seen from above, represent a guiding axle and its two pairs of associated detectors, each corresponding to one direction of movement.

FIG. 3, in effect, shows the front axle 2 of a vehicle rolling in the direction of the arrow $a$. The probes P1 and P2, situated in front of axle 2, are in contact with rails R1 and R2 and orient the wheels 3 by means of the mechanism symbolized by lever 5 so that the longitudinal symmetry axis $a$ V of the vehicle will again coincide with the axis $a$ R of the road, represented by the dotted line drawn at an equal distance from rails R1 and R2 and parallel to them after the distance e separating them initially has been corrected.

Figure 4:
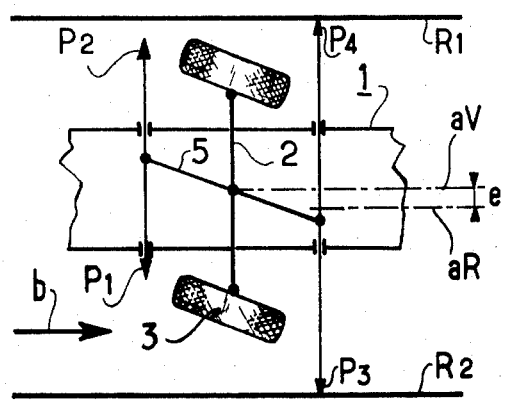

In FIG. 4, the same axle 2 is intended to bring the vehicle back in line according to arrow $b$ and to eliminate the distance e separating the axis of the vehicle from that of the road. For that purpose, probes P3 and P4, arranged in front of axle 2, opposite the direction of movement, control the orientation of wheels 3 in order to perform said correction. The inclination of wheels 3 with respect to the axis of the road is the inverse of that necessary for the execution of such a correction, while moving according to arrow $a$.

Figure 5:
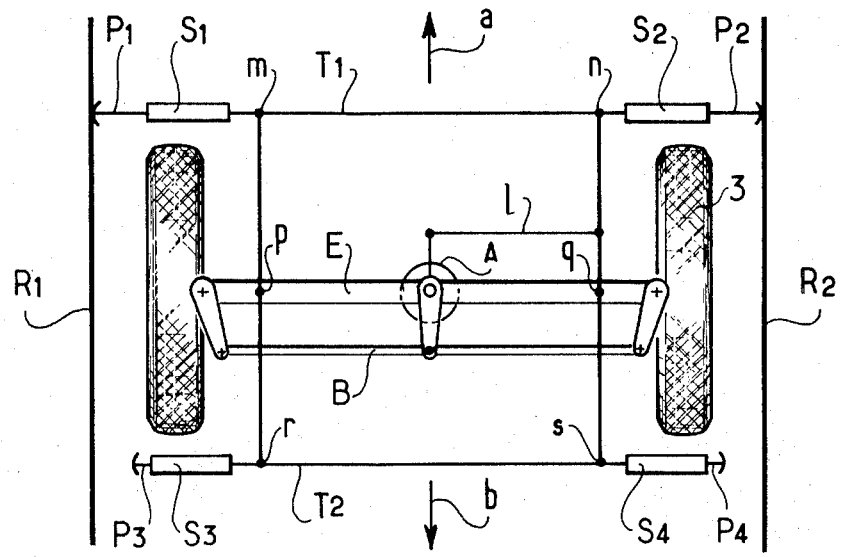
FIG. 5 shows a detail of the control through the detectors of a directional axle, of an axle with guiding wheels.

In FIG. 5, the guiding wheels 3 of each axle E are connected by a coupling bar B. The guide probes P1, P2, P3, P4 are controlled by connection means such as fluid systems which themselves are installed in pairs on crossbars T1 and T2.

The fluid systems themselves are installed in pairs S1, S2, S3 and S4 at the ends of the crossbars T1 and T2, respectively. They can move transversally because of a double parallelogram $m, n, r, s$, articulated at $p$ and $q$ on the axle E, while said parallelogram by means of a lever 1, either directly or with the help of a servo-control or a control device A, controls the coupling bar B.

A single pair of probes is used, considering the direction of movement of the vehicle. The pair used is the one situated in front of axle E with respect to the direction of movement so as to guarantee stable guidance, that is to say, the pair carried by crossbar T1, for direction $a$, and by crossbar T2 for direction $b$.

Figure 6:
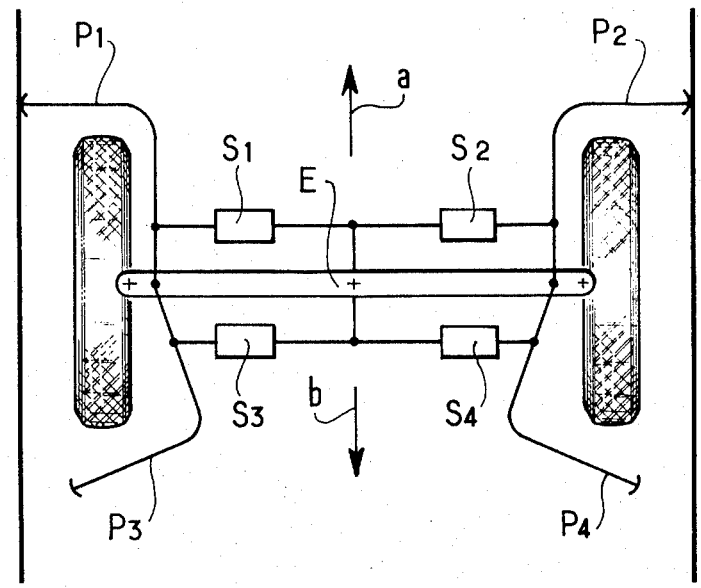
FIG. 6 is a variation of FIG. 5.

In FIG. 6, the probes P1, P2, P3 and P4 are, by way of variation, carried by bent levers controlled by the respective systems S1, S2, S3 and S4. The coupling bar and its operation are the same as for FIG. 5 and have not been shown here.

Figure 7:
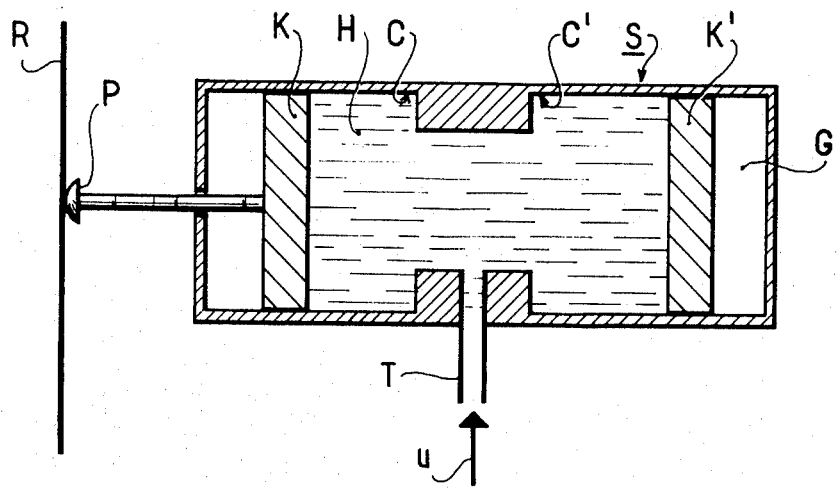
FIGS. 7 and 8 show the fluid control system of a detector in the active and in the passive positions, respectively.
Figure 8:
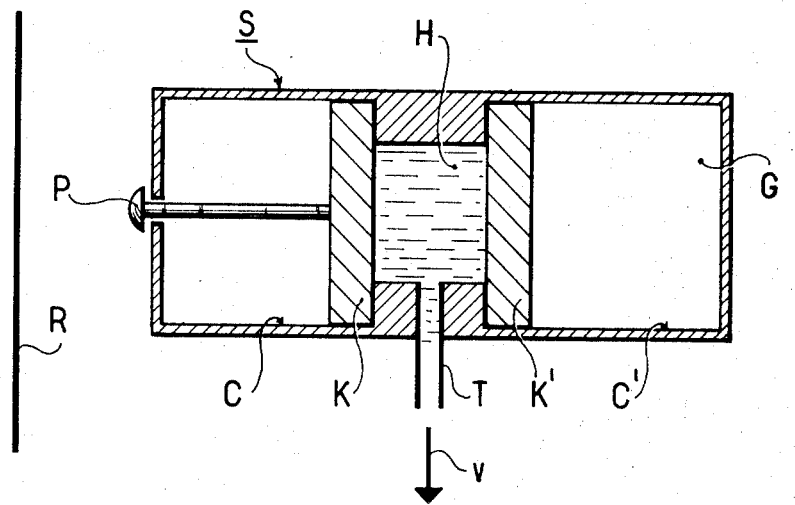

In FIGS. 7 and 8, a system S for the fluid control of the probes, with cylinders C and C', is shown, respectively, in the active position with probe P stuck out and supported on rail R, and in the resting position with the probe retracted.

In cylinders C and C', the pistons K and K' move under the action of the liquid H such as oil which is under pressure and connected by tube T to an outside fluid supply source. The piston K is connected to the probe P while the piston K' is free and on its other face is subjected to the counter pressure of compressed gas G that fills the remaining volume of cylinder C'.

When the probe is in positive action, the oil penetrates through pipe T, according to the direction of arrow $u$, into the cylinders C and C' and the two pistons move away, one of them, piston K moves away until the probe P touches the rail R, while the other one, K' moves until the oil pressure balances the gas pressure. In the passive position, the oil returns along arrow $v$ to the fluid source which must then be in a slight depression and the pistons apprach each other while the probe disappears.

Thus, when the vehicle in FIG. 5 is to move in the direction of arrow $a$, the systems S1 and S2 put their probes in the active position, while the systems S3 and S4 and their corresponding probes remain in the passive position. The inversion of the probes is accomplished when the vehicle must move in the direction of arrow $b$.

The arrival and return of the oil are controlled automatically by the known mechanism — not shown here — for the inversion of the direction of the movement of the vehicle.

The oil pressure must be enough to bring about the orientation of the wheels by the kinematic circuitry concerned; while the gas pressure upon piston K' introduces the desired elasticity to compensate for the distance gaps between the rails, the vehicle thus always remaining well centered with respect to these rails being doubly guided by two probes symmetrically arranged with respect to the longitudinal axis of the vehicle.

The pistons can be replaced by elastic membranes.

Figure 9:
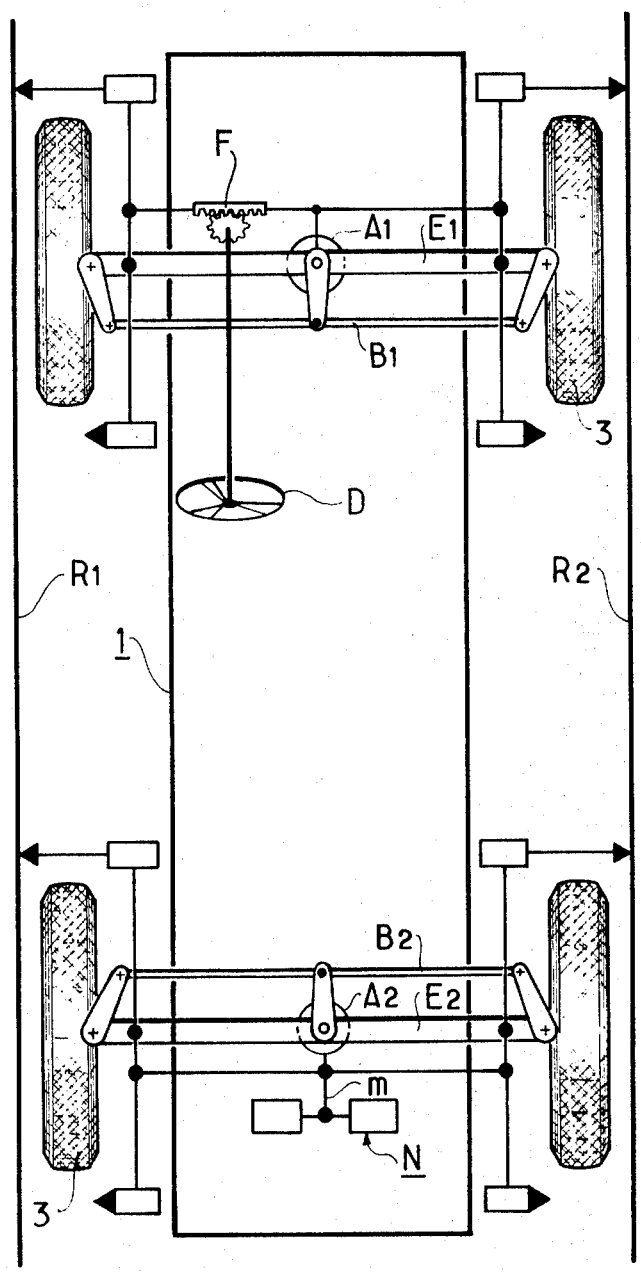
FIG. 9 shows, seen from above, a duomodal vehicle with two directional axles, the front one being equipped with a steering wheel, the rear one being equipped with a system for returning the wheels to the straight position.

In FIG. 9, the vehicle with body 1 of the duomodal type, with two directional axes, runs in a preferential direction. Associated with front axle E is a steering wheel D serving for the manual control of the vehicle with the help of toothed rack F acting upon the coupling bar of the wheels by means of a servo-control A1. The rear axle E2 has its rear wheels placed and kept in the straight position during guidance in a protected site. If the movement of the vehicle is on a public thoroughfare under manual driving control, so as to be driven in the manner of an automobile, a lever acts on the corresponding coupling bar B. The lever $m$ is controlled by a device N with cylinders and fluid acting upon two opposing pistons in order to achieve a stable position of equilibrium of the wheels which have been returned to the straight position.

The lever $m$ acts either directly upon the coupling bar B2 or through a servo-control A2.

When it is desired to place the vehicle on a guiding track, it is only necessary to properly orient the vehicle. To facilitate engagement, the gap of the guide rails is by virtue of design initially greater and is then gradually returned to its normal value. The power of the wheel orientation control mechanism must of course be enough to overcome the effort involved in straightening out the wheels as applied by system N and acting in parallel upon coupling bar.

When load conditions so require, the axles can be replaced by bogies with several axles.

While the invention has been particularly shown and described with reference to the preferred embodiment thereof, it will be understood by those skilled in the art that various changes in form and details may be made therein without departing from the spirit and scope of the invention.

I claim:

1. A guidance system for a vehicle with at least two pairs of guiding wheels for movement of said vehicle in two directions, said system comprising:

a. guide track means mounted along the path of said vehicle;
   b. probe means mounted on said vehicle for engaging said guide track means, said probe means comprising two sets of probes associated with each pair of guiding wheels;
   c. connection means on said vehicle for automatically controlling the operation of said sets of probes and operable such that only one of said two sets of probes is active when said vehicle moves in a first direction and the other of said two sets of probes is active when said vehicle moves in a second direction;
   d. orientation members associated with each of said pairs of wheels wherein said connection means connects said orientation members to said probe means;
   e. manual control means for controlling the direction of said vehicle, said manual control means including steering wheel means for controlling one pair of said guiding wheels at a time;
   f. switching means for switching to said manual control; and
   g. recovery means for automatically returning the other pairs of said guiding wheels to a straight position when the control of said vehicle is switched to manual control.

2. The guidance system according to claim 1, wherein said probe means are directly connected to the wheel orientation members of said vehicle.

3. The guidance system according to claim 1, further including a servo-mechanism for connecting said probe means to the wheel orientation members of said vehicle.

4. The guidance system according to claim 1 wherein said one pair of guiding wheels are the front wheels and said other pairs of guiding wheels includes the rear wheels.

* * * * *